(No Model.)
A. M. SHURTLEFF.
VALVE FOR PNEUMATIC TIRES.
No. 494,088. Patented Mar. 21, 1893.
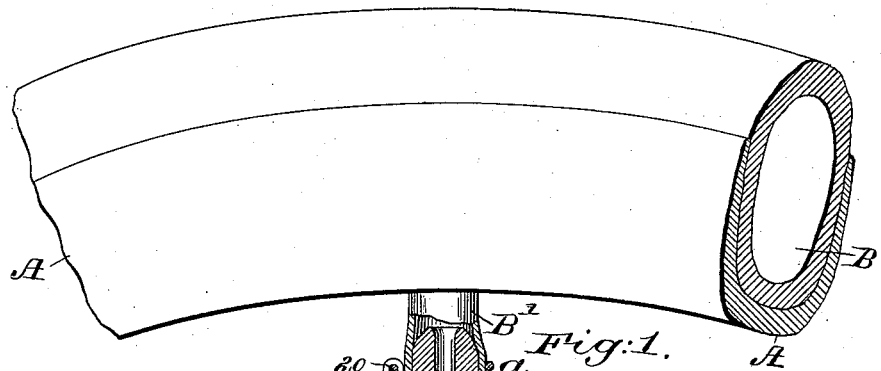
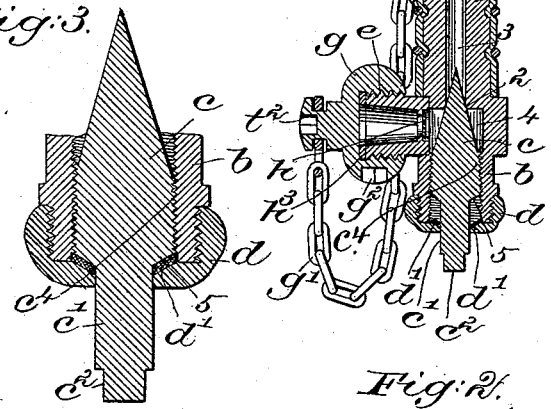
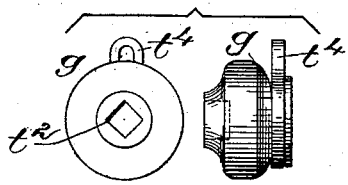
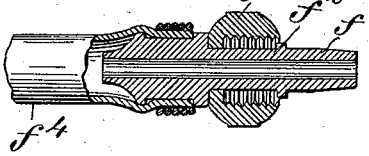
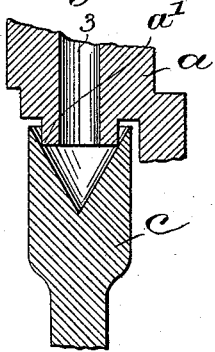
Witnesses.
Fred S. Greenleaf.
Edward F. Allen.
Inventor.
Asahel M. Shurtleff.
by Crosby & Gregory
Attys.
THE NORRIS PETERS CO., PHOTO-LITHO., WASHINGTON, D. C.

UNITED STATES PATENT OFFICE.

ASAHEL M. SHURTLEFF, OF BOSTON, MASSACHUSETTS, ASSIGNOR TO CODMAN & SHURTLEFF, OF SAME PLACE.

VALVE FOR PNEUMATIC TIRES.

SPECIFICATION forming part of Letters Patent No. 494,088, dated March 21, 1893.

Application filed February 13, 1892. Serial No. 421,383. (No model.)

*To all whom it may concern:*

Be it known that I, ASAHEL M. SHURTLEFF, of Boston, county of Suffolk, State of Massachusetts, have invented an Improvement in Pneumatic Tires, of which the following description, in connection with the accompanying drawings, is a specification, like letters and figures on the drawings representing like parts.

As pneumatic tires are advancing in public appreciation especially for use in connection with wheels for bicycles and the like it becomes a matter of importance that the means employed to retain air in the hollow flexible tire, besides being efficient for such purpose shall also be very durable and easily operated, and to this end I have devised and combined with the tire a novel valve. For security against leakage or escape of air the contact between the valve and its seat must be very close, and to effect this close fit I have devised a tapering or conical surfaced valve, it co-operating with a seat made as an edge or corner arranged as a ring or annulus so that the contact between the seat edge and valve is in a single line thus constituting a single line contact. This kind of valve may be kept air-tight on its seat by the exertion of but a minimum amount of pressure and consequently with but a minimum of wear, and further dust cannot lodge on the contact surface of the seat and cannot therefore interfere with closing the valve air-tight.

In accordance with my invention the annular corner or edge constituting the valve seat is shown as forming a part of a valve-case or shell in communication with the tire, and the valve co-operating with the seat is made tapering or conical in form and hence is adapted to fit tightly the annular corner or edge constituting the seat, the contact being a single line contact.

The valve as shown has a screw-threaded stem which fits screw threads at the interior of the valve case, the valve stem being extended outwardly through a suitable stuffing box suitably applied to the valve case, preferably screwed upon it, the said stuffing box, of any usual or suitable form, having a packing against which may bear a shoulder of the valve when the latter is moved outwardly to its farthest extent away from the valve seat. The valve case enters, as herein shown, a flexible tube-like portion in communication with the tire; the valve case having at one side a hollow stem either integral with or separate therefrom. This stem will preferably contain some sort of a check valve, and externally the stem will be threaded to receive upon it a dust-cap, a portion of which may be shaped to constitute a valve wrench. The stem is suitably shaped to have applied to it a nozzle in communication with a pipe, in turn in communication with some suitable source of compressed air, such as an air pump, or equivalent, and the nozzle has a ring-nut which is adapted to be secured upon the stem in such manner as to prevent the escape of air when the pump or other device is being used to fill the tire the said conical valve being then away from its seat.

Figure 1, in vertical section shows a portion of a wheel and pneumatic tire together with a valve embodying my invention. Fig. 2, is a longitudinal section of a coupling to be described. Fig. 3, is an enlarged detail showing the valve in its retracted position or away from the seat. Fig. 4, represents in front and side views a modified form of dust-cap. Fig. 5, is a modification showing the valve-seat as provided with a thumb nut; and Fig. 6, on an enlarged scale shows a modified form of valve and seat to be referred to.

In the drawings A represents part of the felly of a wheel; B part of the pneumatic tire which may be of any usual or suitable kind; and B' a hollow pipe extended through the felly and in communication with the tire, the said pipe being preferably of india rubber. This pipe receives within it a tubular shank $a$, of the valve-case, it having a hollow passage 3 and an annular corner or edge 2, the latter constituting what I shall denominate a single line contact-seat. This valve-case is so shaped internally as to leave a space 4, and the outer end of the case is herein represented as threaded both internally and externally, the external threads serving to keep in place a suitable stuffing-box $d$ provided with suitable packing $d'$ and having a hole out through which is extended the shank $c'$ of the conical surfaced valve $c$. A portion of the valve referred to is threaded as at $c^4$ to engage the internal screw threads of the portion $b$ of the valve case. The tapering or conical portion of the valve $c$, as best represented in Fig. 1, enters the passage 3 and when sufficiently far therein meets the seat 2 forming a single line contact.

By employing for the valve-seat 2 an edge or corner disposed as an annulus, as shown, and by using a valve provided with a tapering or conical face to form a single line contact therewith, it is possible to form a secure and reliable air-tight joint with the exertion of but slight pressure between the valve and its seat, and owing to the shape of the valve and seat but slight movement of the valve is required to open and close the air passage, and as the pressure or contact between the valve and seat is slight, the wear consequent upon repeated closures of the valve will be slight, and furthermore, owing to the small extent of the surfaces in contact, the opportunity offered for dust and other substances to prevent the proper seating of the valve is done away with. To provide against wear of the parts, I anneal the valve seat, or that portion of the valve-case containing the seat, and make the valve of a hard metal such as aluminum or silicon bronze, or steel, such hard valve serving to burnish and adapt the seat to it.

With a valve seat and co-operating valve of different degrees of hardness as specified all the wear comes upon the seat so that the taper of the valve is not affected, and the corner of the seat is always kept in operative condition or in condition to fit the valve.

The valve-case described may be made by boring a metallic rod, for instance, a brass rod, I having found that a valve casing so produced possesses especial advantages, as for instance, the screw threads will wear better and they will be more accurately and nicely formed than when the case is made from a brass casting, and furthermore a case made from such a rod is practically air-tight or non-porous, which is not always the case with the casting.

The dust-cap $g$ may have made in it a suitable opening as $g^2$ to fit the squared end $c^2$ of the valve stem, the said opening being in any part of the cap, and the cap in practice will have attached to it a suitable flexible connection, as $g'$, of chain or otherwise, one end of which is shown as attached to a suitable part of the apparatus, as for instance the pipe $B'$ by any suitable device as a wire 20.

In Fig. 4, I have shown a dust cap in which the wrench opening $t^2$ is made only at the outer end of the cap, the inner end of the cap marked $g$ having an annular groove to receive a loose ring as $t^4$ having an eye with which the chain or flexible part referred to might be attached, or if desired the rider may have a thumb nut as $t^6$ in his pocket which he may apply to the valve stem $c'$. This dust cap $g$ is internally screw threaded to fit the external screw threads on the tubular stem $e$, as shown in Fig. 1, said stem being integral with or attached to the valve case at one side. The stem contains a suitable check valve $h$.

The preferable form of coupling and one which has been found to be practically air-tight is represented in Fig. 2. This coupling consists of the tapering nozzle $f$ adapted to enter the stem $e$, the nozzle having a shoulder $f^2$ to abut against the outer end of the stem, and outside this nozzle is a running nut $f'$ threaded internally to be screwed upon the screw thread stem, and when the threaded nut $f'$ is screwed upon the nozzle it meets the flange $f^2$. The opposite end of the coupling is suitably joined to a pipe as $f^4$ in communication with any source for compressed air, as for instance, an air pump, not shown, but instead of an air pump I may use any suitable air forcing device. To apply the coupling the dust cap must be removed.

When it is desired to force air through the valve case, the valve $c$ will be withdrawn, and to make the said case air-tight or practically so, the shoulder 5 will be brought to bear against the packing $d'$ as shown in Fig. 3, or if said packing is omitted, directly against the interior of the stuffing box, or cap $d$. The pump-coupling or connection shown in Fig. 2, is then inserted in the tubular stem $e$, the dust cap being removed for the purpose, and the air may then be forced through the said tubular stem, and through the hole 3. The valve $c$, may be returned to its normal position, or closed against its seat, when desired, and thereafter the coupling will be withdrawn or disconnected from the stem $e$, and the dust cap or guard $g$ screwed onto the stem as shown in Fig. 1.

Referring to Fig. 6, a portion of the tubular body $a$, is represented having on its inner end or face an annular extension $a'$, and the valve $c$, instead of having a conical end as shown in Fig. 1, has a conical or tapering socket formed in the end of the stem which receives the said annular extension $a'$. The area of contact between the valve and its seat in this instance is exceedingly small, like that shown in Fig. 1, and hence the result is substantially the same, but the form shown in Fig. 1, is deemed preferable owing to cheapness in manufacture, and also ease in keeping the parts clean.

Having described my invention, what I claim, and desire to secure by Letters Patent, is—

1. The internally threaded valve-case provided with a corner-like annular seat as described, combined with a tapering faced valve having a portion of its stem adjacent thereto threaded externally to engage the threads of the valve-case, rotation of the valve in said case moving it toward or away from the seat, substantially as described.

2. The internally threaded valve-case provided with a seat as described, combined with a tapering faced valve having a portion of its stem adjacent thereto threaded externally to engage the threads of the valve-case, and a stuffing-box on the end of the valve-case to receive the shank of the said valve, extended therethrough, substantially as described.

3. The wheel tire, and communicating valve case having a seat and a hollow lateral stem in communication with the valve-case passage, combined with a longitudinally movable valve, and a dust-cap to cover the stem, substantially as described.

4. The wheel tire, and communicating valve-case having a seat and a hollow lateral stem in communication with the valve-case passage, combined with a longitudinally movable valve seat, and a dust cap to cover the stem, said cap having an opening to fit the valve-stem and form a wrench to turn the said valve, substantially as described.

5. In a valve, a valve-case having a valve-seat, and a hollow laterally projecting stem in communication therewith, combined with a pump-coupling consisting of a tapering nozzle adapted to enter said stem, and a threaded cap to engage the end of said stem; substantially as described.

6. In a valve, a valve case having a chamber 4, a passage 3, an annular corner-like seat between them, a tubular stem, and a threaded neck, combined with an externally threaded tapering surfaced valve having a shank, a dust cap, and a stuffing box, substantially as described.

7. In a valve, a valve case having a chamber 4, a passage 3, an annular corner-like seat between them, a tubular stem, a check-valve in said stem, and a threaded neck, combined with an externally threaded tapering surfaced valve having a shank, a dust cap, and a stuffing box, substantially as described.

In testimony whereof I have signed my name to this specification in the presence of two subscribing witnesses.

ASAHEL M. SHURTLEFF.

Witnesses:
GEO. W. GREGORY,
FRANCES M. NOBLE.